A. DE LASKI.
FRICTION FACING FOR CLUTCHES AND THE LIKE.
APPLICATION FILED JAN. 29, 1914.

1,122,081. Patented Dec. 22, 1914.

Witnesses:
Harry G. Fleischer
F. George Barr

Inventor:
Albert de Laski
by his attorneys
Brown & Seward

UNITED STATES PATENT OFFICE.

ALBERT DE LASKI, OF WEEHAWKEN, NEW JERSEY.

FRICTION-FACING FOR CLUTCHES AND THE LIKE.

1,122,081.　　　　　　Specification of Letters Patent.　　Patented Dec. 22, 1914.

Application filed January 29, 1914. Serial No. 815,198.

*To all whom it may concern:*

Be it known that I, ALBERT DE LASKI, a citizen of the United States, and resident of Weehawken, in the county of Hudson and State of New Jersey, have invented a new and useful Friction-Facing for Clutches and the like, of which the following is a specification.

The invention relates to friction facing or surface and is particularly designed for use in connection with clutches, such as the well known disk clutches or cone clutches used in present day motor vehicles.

The object is to provide an article of this character which is woven in circular form and hence need not be distorted from its woven form in order to apply it to use.

Another object is to provide certain improvements in the composition, arrangement and construction of the elements whereby the above-mentioned object may be effectively carried out.

A practical embodiment of my invention is represented in the accompanying drawings, in which—

Figure 1:
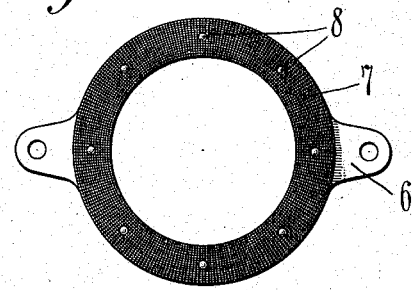
Figure 2:
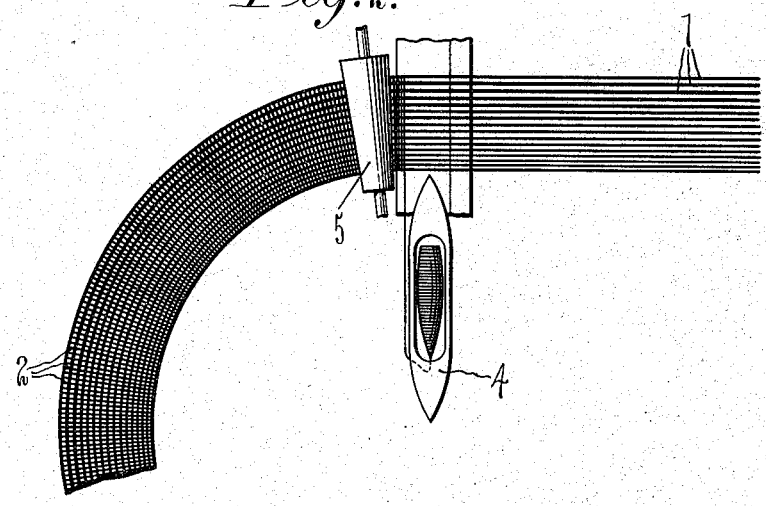
Figure 3:
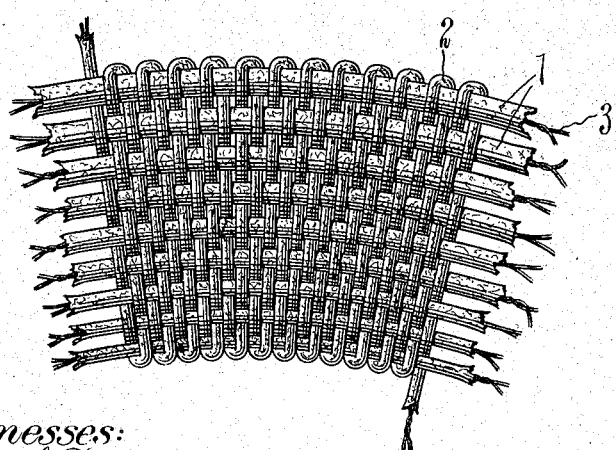
Figure 4:
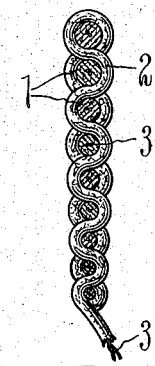

Figure 1 represents a face view of a conventional form of disk clutch plate with the facing riveted thereon, Fig. 2 represents a detail view of a piece of the fabric showing its curvilinear formation, the shuttle and take-off rolls being diagrammatically shown, Fig. 3 represents a very much enlarged detail view of a section of the fabric showing its construction, and Fig. 4 represents a similar view taken at right angles to Fig. 3.

It has been proposed to utilize a woven fabric as a facing for clutches, and particularly a fabric composed of strands which consist of wire covered with a fiber, such as asbestos. It has been found very difficult, however, to form these clutch facings, owing to the fact that they are required to be circular in form, and such fabric resists strongly efforts to cause it to take a curvilinear formation. Furthermore, the curving of such fabric, when woven straight, necessarily distorts it by stretching the outer portion and compressing the inner portion. This not only weakens the outer portion, but also tends to make the said portion thinner than the inner portion, thereby producing a clutch facing which is lacking in the desideratum of uniform thickness. With these thoughts in mind, I have discovered a method of obviating the above difficulties and defects, which consists in weaving fabric in a circular flat condition. It is thus only necessary to cut off the proper length and unite the ends in order to produce a clutch facing circular in form and of the appropriate size; thereby doing away with the necessity of curving and distorting the fabric.

In carrying out this invention, I weave the fabric on an ordinary loom adapted to weaving, for instance, fabric belting, said loom being provided with suitable take-off mechanism adapted to the curvilinear feature of the fabric. The circular woven effect is gained by utilizing for the warp threads which are nearer that side of the fabric which is to be the outer periphery thereof, strands greater in diameter than that used for the other side of the fabric. This enlargement of the warp threads causes one side of the fabric to build faster than the other, and hence, so to speak, automatically produces the curved effect. I prefer to graduate the warp threads so that they grow thicker as they approach the outer periphery of the fabric.

In the accompanying drawings, the warp threads are denoted by 1 and the weft threads by 2. These threads are preferably composed of strands of wire, such as copper or brass wire 3, which are covered with a suitable heat and wear resisting fiber, such as asbestos.

The shuttle is conventionally represented by 4, and the cone-shaped rollers which are adapted to take off the fabric by 5 (only one of said rollers being shown).

The clutch plate is indicated by 6 and the facing 7 is secured thereon in the ordinary manner by rivets 8; which rivets preferably have their heads countersunk below the surface of the facing 7.

After the facing has been formed as above described, it may be impregnated with a vulcanizable compound, subjected to a heavy pressure for condensing it, and then cured or vulcanized in a well known manner.

It is to be understood that various changes may be resorted to in the form and arrangement of the several elements without departing from the spirit and scope of my invention; hence I do not intend to be limited to specific details except as they may be set forth in the claims.

What I claim is:—

1. A facing for clutches and the like consisting of a flat circular woven fabric having its warp threads increasing in diameter from its inner toward its outer periphery.

2. A facing for clutches and the like consisting of a flat circular woven fabric composed of threads made of fiber covered wire and having its warp threads increasing in diameter from its inner toward its outer periphery.

3. A facing for clutches and the like consisting of a flat circular woven fabric composed of threads made of asbestos covered wire and having its warp threads increasing in diameter from its inner toward its outer periphery.

In testimony, that I claim the foregoing as my invention, I have signed my name in presence of two witnesses, this twenty-eighth day of January 1914.

ALBERT DE LASKI.

Witnesses:
F. GEORGE BARRY,
HENRY C. THIEME.